Feb. 20, 1951     S. M. GOODRICH     2,542,407
TOOL TO DETERMINE THE PROPER ANGLES OF THE
CUTTING LIPS OF TWIST DRILLS
Filed March 5, 1948

INVENTOR.
S. Max Goodrich.
BY
Samuel H. Davis

Patented Feb. 20, 1951

2,542,407

UNITED STATES PATENT OFFICE 2,542,407

TOOL TO DETERMINE THE PROPER ANGLES OF THE CUTTING LIPS OF TWIST DRILLS

Savy Max Goodrich, Lansing, Mich.

Application March 5, 1948, Serial No. 13,264

1 Claim. (Cl. 33—201)

This invention relates to tools useful in grinding the lips of twist drills, is particularly concerned with a tool for determining the angles of the cutting lips of twist drills, and is more particularly concerned with a modified form of the tool disclosed and claimed in my copending application, Serial No. 764,618, filed July 30, 1947, now Patent Number 2,506,868, issued May 9, 1950.

In the use of twist drills particularly for boring holes in metals it is very important that the two cutting lips of the drill have the proper angle in respect to the axis of the said drill. Obviously, the angle of the cutting lip determines the length of the same, and it is for this reason that the angles of each of the two cutting lips be the same. Should the angle of the cutting lips vary the hole formed by the drill will be of greater diameter than the diameter of the said drill. It is therefore very important that the two lips of the cutting edge of a twist drill have the same angle and therefore be of the same length.

In the past resort has been made to the use of graduated scales for determining the angle and length of the cutting lips of a twist drill. There are serious objections to the use of such tools because each lip must be measured individually, and this is time consuming and such practice is at best substantially inaccurate.

It is an object of this invention to provide a tool by the use of which the angles of the lips of the drill can be determined rapidly. It is a further object to provide a tool whereby the angles of such lips can be determined substantially accurately. It is a further object to provide a tool whereby the angles of the lips of twist drills may be determined by a worker who possesses only a limited amount of mechanical skill.

I have now discovered and invented a tool for gauging twist drills comprising an adjustable V-rest for receiving the shank of a drill, a supporting rod, a base for supporting the said rod, a metal case, the said base being securely attached to the top of the said case, an indexing plate having a plurality of holes of varying dimensions, a vertical cylindrical shaft, the said plate being securely mounted on the top of the said vertical shaft, the said shaft extending downwardly through a cam, the said cam having a plurality of notches along a helical surface on the top of the said cam, an indexing finger attached to the said cylindrical shaft, the said indexing finger adapted to enter selectively each of the said notches, the said cam being securely attached to a horizontal plate fastened in the bottom of the said case, a pair of measuring scales, a pair of pointers, each of the said pointers being mounted on a fulcrum, each of the said pointers having a forked end, a pair of levers, the said forked end being received by a perpendicular pin at one end of each of the said levers, each of the said levers extending substantially from each of the said perpendicular pins, and each of the said levers being movably attached to a shaft, each of the said shafts being received in a bearing, one of the said levers extending to a short bar contacting the helical crest of the said drill, and the other said lever extending to a short bar contacting the cutting edge of the said drill, and the said tool adapted to indicate the length of the lips, and the angle of the said lips of twist drills, and I am now able to avoid the disadvantages of the prior art and am able readily to accomplish the objects set forth.

Referring to the drawings.

Figures 1, 2:
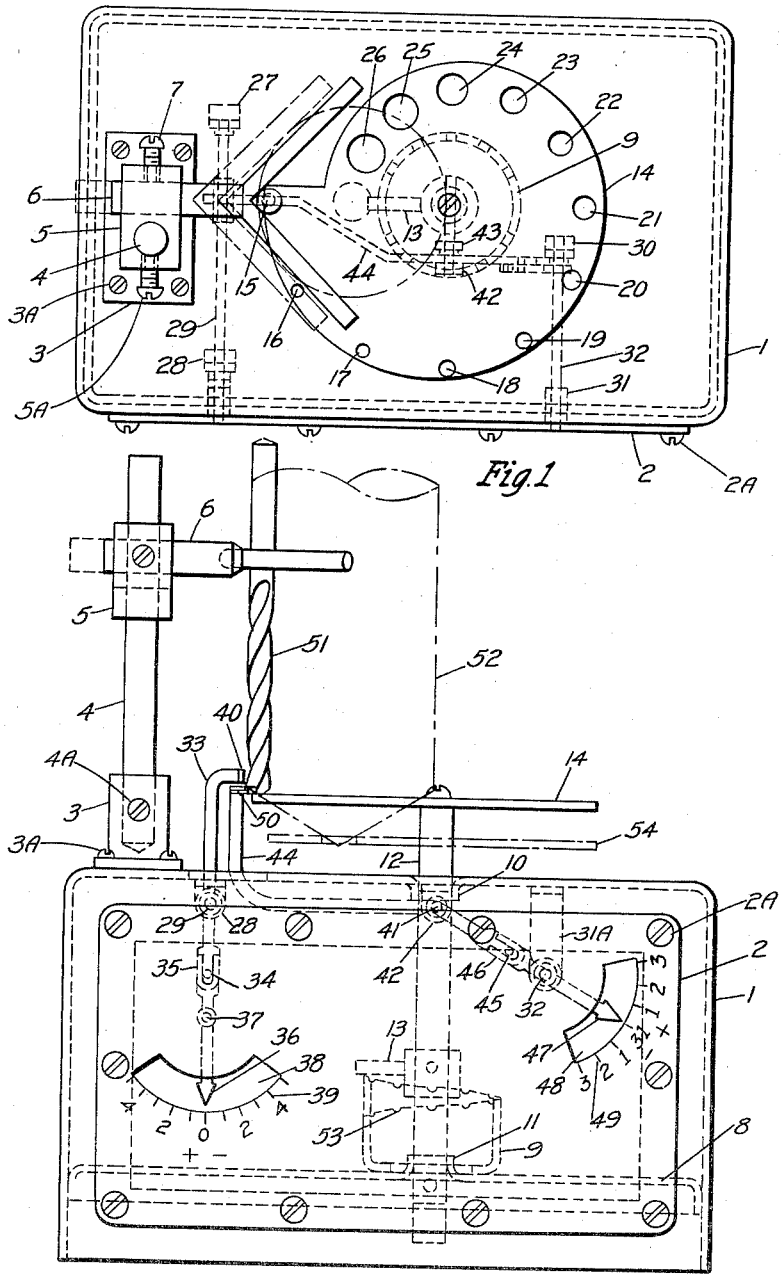
Fig. 1 is a plan view of my invention.
Fig. 2 is a side elevation of the same.

The metal case 1 has a handhole plate 2 attached to the side of the case by a plurality of screws 2a. Attached to the top of the said case is a base 3. The said base 3 is attached to the said case 1 by means of four screws 3a. The supporting rod 4 is held in a hole in the said base 3 and is further held by the adjusting screw 4a. The bearing piece 5 has a vertical hole through which the rod 4 is inserted. The said bearing piece 5 is adjusted and held in place by means of the set screw 5a. The steady rest 6 is inserted through a horizontal hole through the said bearing piece 5 and is adjusted and held in place by means of the screw 7. A horizontal suppporting plate 8 is welded in the lower portion of the inside of the case 1. A notched indexing cam 9 is welded to the said support plate 8. A pair of bearings 10, and 11, support the vertical shaft 12. The bearing 10 is attached to the top of the case 1; and the bearing 11 is attached to the horizontal supporting plate 8. An indexing finger 13 is attached to the shaft 12. An indexing plate 14 is attached to the top of the shaft 12. The said plate 14 has a plurality of holes, 15 through 26, varying in diameter size to receive the cone proper of the various common sized drills. The supporting shaft 29 is supported by a pair of bearings 27, and 28. The said bearings 27, and 28, are attached to the inside of the top of the metal case 1. The shaft 29 supports the lever 33. The upper end of the said lever 33 has a short bar 40 attached thereto. A pin 34 is attached to the lower end of the said lever 33, and is perpendicular to the said lever 33. The pointer 36 has a forked end 35. The pin 34 receives the said forked end 35 of the pointer 36. The pointer 36 pivots on the fulcrum pin 37. The bearings 42, and 43, receive the shaft 41. The shaft 41 carries the lever 44. To the lower end of lever 44 a pin 45 is attached perpendicularly to the same, and the said pin 45 receives the forked end 46 of the pointer 47. The said pointer 47 pivots on the shaft 32. The shaft 32 is received by the bearings 30, and 31, which bearings are supported by the supports 31a. The lower end of the pointer 47 is visible through the window 48, and points to the measuring scale 49. A small beveled bar 50 is attached to the upper end of the lever 44. The shank of a small drill 51, for example, is placed against the V-rest 6, the indexing plate 14 is rotated so that the appropriate hole (15 through 26) is directly beneath the said drill, and the cutting end of the said drill 51 is placed in a small hole in the indexing plate 14. The V-rest is adjusted by unscrewing the set screw 7 and by moving the shank of the said V-rest either way through the hole in the bearing piece 5. When the V-rest is set in the proper place the set screw 7 is screwed in against the shank of the said V-rest to keep it in place. The drill 51 is rotated with the bar 50 in contact with the cutting edges of the same. If the cutting angles are true the pointer 47 will register on thirty-one of the scale 49. If the pointer registers at either side of thirty-one, the cutting edges need to be reground. As the drill 51 is rotated, the helical crest of the same is in contact with the bar 40. If the centering of the drill is true the pointer 36 will register on the zero mark of the scale 39. If the pointer registers at either side of the zero mark, the center is not true and the drill needs to be reground.

When a drill of a larger size, the drill 52, for example, is to be tested, the index plate 14 is rotated and depressed so that the indexing finger 13 rests in the proper notch 53 of the cam 9. The hole in the said plate 14 is then located directly underneath the said drill, and the cone proper of the drill is received in said hole.

I wish particularly to point out that the bar 40 attached integrally to the upper end of the lever 33 is important in that it serves in preventing the said end of the lever from falling into the helical groove portion of the drill. As the drill is rotated and the bar is in contact with one of the helical crests, the said bar extends sufficiently to come in contact with a portion of the other helical crest and thereby prevents the bar from falling into the said helical groove.

I wish further particularly to point out that the beveled bar 50 attached integrally to the upper end of the lever 44 is important in that it serves in preventing the said end of the lever from falling into the helical groove portion of the drill. As the drill is rotated and the bar is in contact with the helical crest of one of the lips, the said bar extends sufficiently to come in contact with a portion of the other crest and thereby prevents the bar from falling into the helical groove.

I claim:

A tool for gauging twist drills, comprising an adjustable V-rest for receiving the shank of a drill, a supporting rod on which the V-rest is adjustably mounted, a base for supporting the said rod, a metal case, the said base being securely attached to the top of the said case, an indexing plate having a plurality of holes of varying dimensions, a vertical cylindrical shaft, the said plate being securely mounted on the top of the said vertical shaft, a cam, the said shaft extending downwardly through said cam, there being a plurality of notches along a helical surface on the top of the said cam, an indexing finger attached to the said cylindrical shaft, the said indexing finger adapted to enter each of the said notches, a horizontal plate, the said cam being securely attached to said horizontal plate substantially near the bottom of the said case, a pair of measuring scales, a pair of pointers, each of the said pointers being mounted on a fulcrum, each of the said pointers having a forked end, a pair of levers, a pair of pins, each of the said forked ends being received by a pin at one end of each of the said levers, each of the said levers extending substantially from each of the said pins, a plurality of shafts each of the said levers being movably attached to a shaft, each of the said shafts being received in a pair of bearings, one of the said levers having a short bar contacting the helical crest of the said drill, and the other said lever having a short bar contacting the cutting edge of the said drill, and the said tool adapted to indicate the length of the lips, and the angle of the said lips of twist drills.

S. MAX GOODRICH.

REFERENCES CITED

The following references are of record in the file of this patent:

UNITED STATES PATENTS

| Number | Name | Date |
| --- | --- | --- |
| 609,895 | Mitchell | Aug. 30, 1898 |
| 1,400,331 | Turrettini | Dec. 13, 1921 |
| 1,431,614 | Wittner | Oct. 10, 1922 |
| 1,487,092 | Dingel | Mar. 18, 1924 |
| 2,301,256 | Conners | Nov. 10, 1942 |
| 2,324,476 | Becker | July 20, 1943 |
| 2,377,715 | Poncelet | June 5, 1945 |
| 2,385,396 | Baum | Sept. 25, 1945 |
| 2,506,868 | Goodrich | May 9, 1950 |

FOREIGN PATENTS

| Number | Country | Date |
| --- | --- | --- |
| 218,669 | Switzerland | Apr. 1, 1942 |
| 876,855 | France | Nov. 19, 1942 |

OTHER REFERENCES

Publication, "American Machinist," May 22, 1930.